United States Patent [19]
Williams

[11] Patent Number: 5,745,836
[45] Date of Patent: Apr. 28, 1998

[54] UNDESIRABLE ENERGY SUPPRESSION SYSTEM IN A CONTENTION BASED COMMUNICATION NETWORK

[75] Inventor: Thomas H. Williams, Longmont, Colo.

[73] Assignee: Cable Television Laboratories, Inc., Louisville, Colo.

[21] Appl. No.: 598,333

[22] Filed: Feb. 8, 1996

Related U.S. Application Data

[63] Continuation-in-part of Ser. No. 522,630, Sep. 1, 1995.
[51] Int. Cl.[6] .............................. H04N 1/00; H04N 7/14
[52] U.S. Cl. .............................. 455/5.1; 348/12; 455/4.2
[58] Field of Search ........................ 348/5.5, 6, 7, 10,
348/11, 12, 13; 455/3.1, 4.1, 4.2, 5.1, 6.1,
6.2; 395/200.47–200.49; H04N 7/10, 7/14,
7/173

[56] References Cited

U.S. PATENT DOCUMENTS

| | | | |
|---|---|---|---|
| 3,924,187 | 12/1975 | Dormans | 455/4.1 |
| 4,002,843 | 1/1977 | Rackman | 455/5.1 X |
| 5,570,347 | 10/1996 | Bestler et al. | 370/17 |
| 5,606,725 | 2/1997 | Hart | 455/5.1 |

Primary Examiner—Mark R. Powell
Assistant Examiner—John W. Miller
Attorney, Agent, or Firm—Duft, Graziano & Forest, P.C.

[57] ABSTRACT

An undesirable energy suppression system in a contention based communications network having a shared communication path between a plurality of remote points and a headend in a simplex network or a bidirectional network. The system includes a method and apparatus for transmitting a signal on the shared communication path from any one of the plurality of remote points contending for the shared communication path, to the headend. The signal includes a gate enabling signal also known as a prybar signal. The shared communication path includes a gate where the gate connects the shared communication path when the gate is closed, and the gate disconnects the shared communication path when the gate is open. The system controls the gate in response to receiving the gate enabling signal. Absent a gate enabling signal, any signal or other energy on the shared communication path will not propagate through the network because the shared communication path is disconnected.

In one embodiment a single gate is located where it can serve an entire distribution branch of remote points in a tree and branch style network. In another embodiment there is a gate dedicated to each individual remote point in the network.

31 Claims, 9 Drawing Sheets

UNDESIRABLE ENERGY SUPPRESSION SYSTEM IN A CONTENTION BASED COMMUNICATION NETWORK

CROSS REFERENCE TO RELATED APPLICATION

This application is a Continuation-In-Part of U.S. patent application Ser. No. 08/522,630, filed Sep. 1, 1995, titled "Bi-directional Cable Network Signal Distribution System," whose disclosure is hereby incorporated by reference to the same extent as if fully set forth herein.

FIELD OF THE INVENTION

This invention relates to communication networks, and more particularly to a contention based multiple access system that prevents and/or suppresses undesirable energy in a simplex network or on the return path of a bidirectional network from adversely affecting the entire network.

PROBLEM

Existing communication network plants include at least a simplex communication path and often a bidirectional communication path capability between a plurality of remote points and a headend in a tree and branch type network. In a simplex network, a headend is a collection point and the plurality of remote points are origination points for network transmissions also known as signals. In a bidirectional network, a headed is a collection/origination point for forward path signals into the network and the collection/ termination point for return path signals from the plurality of remote points in the network. The collection/origination point and the collection/termination point functions of a headed may not necessarily be in the same physical location in a bidirectional network. For purposes of this document, a simplex network implementation is similar to the return path direction of a bidirectional network implementation that does not have a forward path. A bidirectional communication path, for example, can be a single coaxial cable that simultaneously carries broadband Radio Frequency (RF) signals in two directions on the same shared cable by dividing the frequency spectrum of the bidirectional communication path. The frequency spectrum is divided into a first frequency range for carrying signals in a first direction also known as the downstream or forward path direction from the headed signal source to the plurality of remote points, and a second frequency range for carrying signals in a second direction also known as the upstream or return path direction from each remote point to the headed. For example, a bidirectional communication path might include a first frequency range at or about 54–750 MHz for carrying signals in the forward path direction and a second frequency range at or about 5–40 MHz for carrying signals in the return path direction.

Various protocols exist that allow multiple users to access and use a common transmission facility without users interfering with each other. Frequency Division Multiple Access (FDMA) is one such protocol that facilitates transmitting data signals from different transmitters on different carrier frequencies so that the transmissions do not interfere with each other. A cable television downstream system is one example of a technology that uses FDMA. Time division multiple access (TDMA) is another protocol that facilitates synchronous transmissions from individual ones of a plurality of remote point users by sharing access to a single channel on the bidirectional communication path for a reoccurring portion of time. A telephone channel bank system is one example of a technology that uses TDMA. Note, that the TDMA and FDMA protocols can be combined. For example, a TDMA protocol may be implemented on any one or all of the frequencies of an FDMA based system. Combined TDMA and FDMA protocols are commonly used in applications that transmit data at a relatively constant rate.

For applications where transmissions are bursty such as computer file transfers, interactive games, remote CD-ROM access, simplex network transmissions, and internet browsing, overall channel utilization may be low so that a contention based or random access protocol may provide faster and more complete transmission access than constant rate synchronous transmission systems. Examples of contention based access systems include, but are not limited to, Aloha, slotted Aloha, Carrier Sense Multiple Access with Collision Detection (CSMA/CD), and Distributed Queuing Reverse Access Protocol (DQRAP) or Extended DQRAP (XDQRAP). The most basic contention based protocol is a simple interrupt burst transmission in a simplex network that does not require an acknowledgment. A fire alarm or other alarm are examples of systems that could use the simple interrupt burst transmission protocol to send a single message with no return acknowledgment necessary. The simple interrupt burst transmission protocol can also be implemented on the return path direction of a bidirectional communication network.

The Aloha protocol may be described as a free-for-all where a transmitting user randomly transmits a signal and then listens for an acknowledgment of the transmission. If no acknowledgment is received after some predetermined time, the transmission is resent because the transmission path was not clear-to-send although the Aloha transmitter did not know it at the time of the transmission. Slotted Aloha is similar to the standard Aloha previously described although slotted Aloha uses reoccurring time slots shared by all transmitting users to improve transmission throughput. The CSMA/CD protocol allows multiple transmitting users to transmit on a shared channel at any time a transmitting user detects that the transmission channel is clear-to-send or otherwise available for transmitting. If two or more transmitting users attempt to transmit on the same channel simultaneously, a jammed status signal is generated for the channel and retransmissions are attempted after random time delays by the colliding users when a clear status signal exists for the channel. Although the above identified contention based systems exhibit quick access when there is low loading of the network, overall throughput may be adversely affected at high network loading times when frequent transmission access collisions occur. Note that the transmission time delay in the network and the transmission packet size are critical parameters that affect the maximum capacity of a CSMA/CD based system. CSMA/CD is currently in wide use on Local Area Networks (LANs) including the popular IEEE 802.3 protocol. Data and Computer Communications by William Stallings (4th ed.) Chapter 9 may be used as a reference for access control protocols.

DQRAP is a contention based access system with data slot reservations where reoccurring time slots are available at the beginning of predetermined time slot boundaries, and any one remote point can gain transmission access on the carrier by contending for an available or clear time slot. DQRAP timing reference signals are broadcast over the forward path of the bidirectional network so that each remote point is synchronized with the time slot boundaries. A ranging process is used to correct for time delays associated with remote points being at different electrical distances in the network. Two types of DQRAP time slots exist including contention slots known as mini-slots, and data slots. In operation, each remote point contends for a mini-slot when each remote point wishes to send data in the second direction of the bidirectional network. Once a mini-slot is obtained, the headed network controller allocates at least one additional data slot to the successful remote point so that the remote point can transmit a burst of data in the second direction. The data slot(s) may be retained by the transmitting remote point through a reservation system under the control of the network controller in the headed. The remote point may append a reservation request for future time slots in any one present time slot. Thus, DQRAP is a very efficient because it provides very fast access under light network loading, and the overall network utilization is very high under heavy network loading. A network controller in the headed provides control over the time slot allocations to maintain a consistent quality of service for the entire network. The added advantage of XDQRAP is the rapid transmission path access under light network loading, high efficiency under heavy network loading, and the headed controller enforcement of fairness for access to transmission resources and quality of service.

Note that the characteristics of a time slot used in any protocol discussed herein can be downloaded from the headend on the forward path of a bidirectional communication network for use by any of the plurality of remote points. Time slot characteristics can include but are not limited to, frame length, time slot duration, frequency of time slot occurrence within a frame, and use designations such as contention slot, reservation slot, or other fixed or variable designation.

Another contention based system that is in common use for cellular radio systems is Code Division Multiple Access (CDMA). In CDMA, multiple transmitters use the same frequency band at the same time by assigning different codes to different transmitters so that each transmission is distinguishable. Qualcomm is one communications vendor that uses CDMA, also known as direct-sequence spread spectrum. The use of CDMA makes the spread-spectrum transmissions orthogonal to each other, and hence non-interfering.

However, none of the protocols or systems discussed above can protect communications in a network from being disrupted due to undesirable energy entering and propagating through the network. The technical challenge in operating a network having a shared communication path between a headed and a plurality of remote points, is maintaining good network integrity for signals being transmitted through the network. In a bidirectional communication network for example, signals transmitted in the forward path direction from the headed to the remote points enjoy good network integrity because the headed delivers a high quality signal from a controlled source environment. The headed's high quality signal is above the noise floor and other undesirable energy by a sufficient margin for reliable operation. However, signals transmitted in the return path direction from any one remote point to the headed are often not of high quality and can be severely impaired because a remote point is potentially an uncontrolled noise producing environment such as a private home. A private home is considered a potential noise producing environment because it contains multiple entry/origination points for undesirable energy on the bidirectional communication path for reasons including, but not limited to, inadequate house wiring and/or coaxial shield integrity, inadequate grounding, inadequately shielded electrical devices, improper connectivity, and imprecise transmission equipment. Noise and other undesirable energy originating at one remote point or at any point along the return path from that remote point can impair upstream network communications for all remote points in the network. Similarly, where noise and undesirable energy from one remote point is combined with noise and undesirable energy from other remote points in the network, network communications impairments are augmented.

Undesirable energy, often referred to loosely as "noise," occurs in many forms including, but not limited to, Gaussian noise, ingress energy, and common path distortion. However, for purposes of the present discussion undesirable energy also includes unauthorized or pirate signals in the network.

Gaussian noise, also called white noise, is the random noise that forms the relatively constant noise floor that crosses all frequencies in the frequency spectrum of a communication path. Gaussian noise components include naturally occurring thermal noise that is related to temperature. This Gaussian noise forms a noise floor power level which at any given time defines the noise level that a desired RF carrier must exceed to achieve a clearly recognizable signal in a given frequency band.

Ingress is unwanted energy that enters a communication path from a source external to the communication path. Ingress presents one of the greatest problems in a network because the unwanted signal is often an impulse noise that enters the network at a weak point in the network. Weak points in the network are all too often at or near a remote point where there is a shield discontinuity, improperly grounded electrical device, or a faulty connector. Radio frequency carriers from shortwave radio, citizen's band radio, or other broadcast sources may also enter the network at these weak points and cause interference peaks at specific carrier frequencies in the communication path. Another ingress source is impulse noise consisting of high power short duration energy pulses. The high power energy pulse results in a significant rise in the noise floor while the short duration results in an elusive disruption whose source or entry point into the network is difficult to pinpoint. Common bonding of cable grounds to power line grounds conducts high frequency currents that are on the power lines into the cable system. This conduction is more likely to occur if the cable's shield integrity is bad.

Common path distortion is the result of nonlinearities in a network due to physical connector corrosion creating point contact diodes. For example in systems in the United States, the effect of point contact diodes in the return path are triple power peaks at regular 6 MHz intervals in the return frequency spectrum.

Regardless of the undesirable energy source, the combination or summation of undesirable energy throughout a network is called "funneling" or the "funneling effect". The funneling effect is particularly disruptive because the combined noise floor power level is compounded as undesirable energy from multiple sources are combined at directional couplers along the return path to the headed.

For the reasons stated above, there is an existing need for the ability to manage undesirable energy and prevent such energy from disrupting network integrity without compromising network integrity or capacity in a simplex network or in either direction of a bidirectional communication path. A cost-effective solution to this problem has heretofore not been realized prior to the solution disclosed herein.

SOLUTION

The above described problems are solved and a technical advance is achieved in the field by the undesirable energy suppression system of the present invention for use in a contention based network having a shared communication path between a plurality of remote points and a headend in the network. The undesirable energy suppression system can facilitate improved network integrity and pirate-free communications for a network whether the network is a simplex communication network having a single shared communication path or a bidirectional communication network where at least one direction of the communication path is a shared communication path. Note that the shared communication path between a plurality of remote points and a headend in a simplex network is similar to the second direction, also known as the return path direction, of the bidirectional communication network. That is, a simplex network implementation of the present invention is the bidirectional network implementation disclosed herein without the first direction path.

The undesirable energy suppression system includes a method and apparatus for transmitting a signal on a shared communication path from any one of the plurality of remote points contending for the shared communication path to the headend. The signal includes a gate enabling signal also known as a prybar signal. The shared communication path includes a gate where the gate connects the shared communication path when the gate is closed, and the gate disconnects the shared communication path when the gate is open. To thwart pirates and prevent or suppress unwanted signals from propagating throughout the network, the undesirable energy suppression system further includes a method and apparatus for controlling the gate in response to receiving the gate enabling signal. Absent a gate enabling signal, any signal or other energy on the shared communication path will not propagate through the network because the gate will be open so that the shared communication path is disconnected.

The gate is an RF switch or any similarly functioning device that connects and disconnects the shared communication path to prevent any signal or other energy from passing the gate. In one embodiment a single gate is located where it can serve an entire distribution branch of remote points in a tree and branch style network. In another embodiment there is a gate dedicated to each individual remote point in the network. In another embodiment there can be a mixture of gates dedicated to individual remote points and gates shared by remote points on a distribution branch. Further, the gates can be positioned in primary and secondary positions along the shared communication path, where for example, a primary gate is located on the remote point side of a distribution branch and a secondary gate is located on the headend side of where two or more distribution branches are joined.

In a bidirectional communication network there is a bidirectional communication path including a first direction or forward path for carrying a first signal from the headend toward the plurality of remote points, and a second direction or return path for carrying a second signal from any one of the plurality of remote points toward the headend. The second direction or return path is the shared communication path discussed above, where the gate in the return path is often called the return gate.

The first signal in the first direction of the bidirectional communication path can be used to carry a status signal where the status signal is indicative of transmission activity in the second direction including, but not limited to, clear, busy, and jammed. Any of the plurality of remote points can contend for access to the second direction of the bidirectional communication path when the second direction is clear-to-send or otherwise available, meaning the second direction is not in use. If the second direction of the bidirectional communication path is jammed, meaning that two or more devices are attempting to transmit or otherwise access the same transmission channel simultaneously, each of the remote points attempting to simultaneously transmit will retry again or after a random length time delay. If the second direction is busy or otherwise unavailable at the time a remote point desires or attempts to transmit data, the unsuccessful remote point will retry again later when the channel is clear.

Alternatively, the first signal in the first direction of the bidirectional communication path can contain a timing signal and/or other timing information so that a transmitting remote point will know when to transmit a second signal in the second direction or the length of time to transmit a second signal in the second direction for example. The first signal in the first direction may also contain timing information in addition to status information. In either case the first signal status and/or a timing signal in the first direction can be originated by either the headed, a device at a hub site, or a device located at a fiber node. However, throughput can be maximized and the delay in reporting second direction status minimized if the status and/or timing source is closer to the remote points.

Closing the gate or return gate in the shared communication path for transmissions that are accompanied by a gate enabling signal, prevents undesirable, unwanted, and uncontrolled ingressing energy from propagating through the network. If the undesirable energy of one remote point is present on the return path at the time the return gate for a distribution branch closes to allow another remote point's transmission to pass, the unwanted ingressing signal or energy will only affect the clean part of the network for as long as the return gate is closed. The portion of a network between the return gate and the headed is known as the clean part of the network. The portion of a network between the return gate and the remote point is known as the dirty part of a network. If the undesirable energy persists for every transmission passing the return gate for a distribution branch, then the headend can force the gate open to cut off the distribution branch from the network until the undesirable energy source is isolated and/or terminated. Forcing open the return gate in the embodiment where there is a return gate dedicated to an individual remote point will only cut off the offending remote point from the network.

It is possible and common to implement a system that simultaneously uses a combination of contention based systems and/or non-contention based systems in the 5–40 MHZ return plant by assigning each system to a different frequency band. For example, a TDMA system can exist on channel T8, a CSMA/CD system on channel T9, and a CDMA or DQRAP system on T10, where T8, T9, and T10 are each 6 MHZ frequency assignments in the return path frequency spectrum. However, if the undesirable energy is broadband in nature and passes through the return gate, the undesirable energy will affect all other transmissions in the network. This situation can be remedied by using bandpass filters to restrict energy to the assigned band, or by using diagnostic routines to find the source of the ingress by a process of elimination. If the broadband undesirable energy is sufficiently infrequent and the transmission service being offered is not time sensitive such as voice, it may be more cost effective to retransmit the few corrupted frames.

There are many different ways to open and close a return gate or switch for a shared communication path, and the gate enabling signal may be shared among more than one remote point or the gate enabling signal can be unique to an individual remote point. One gate enabling signal can be an RF signaling tone similar to the audio frequency signals in a touch-tone telephone. Another gate enabling signal can be a digital code similar to the system that is used on digital garage-door opener, but with higher speed. Another gate enabling signal can be a frequency mixer at the return gate where the remote point transmitter generates a local oscillator along with the data carrier. The local oscillator will change the frequency of the carrier originating at the remote point to a new frequency that can be transported on the network. This is done by a mixing action which effectively connects the path or closes the gate. Thus, a mixer can act as a gate to disconnect and connect a shared communication path such as the second direction or return path in the bidirectional communication network example. Another gate enabling signal is to send a direct current pulse to turn on the mixer switch although this method must take into account lightning, longitudinal sheath currents, and other voltage surges to the cable plant.

DETAILED DESCRIPTION

Figure 1:
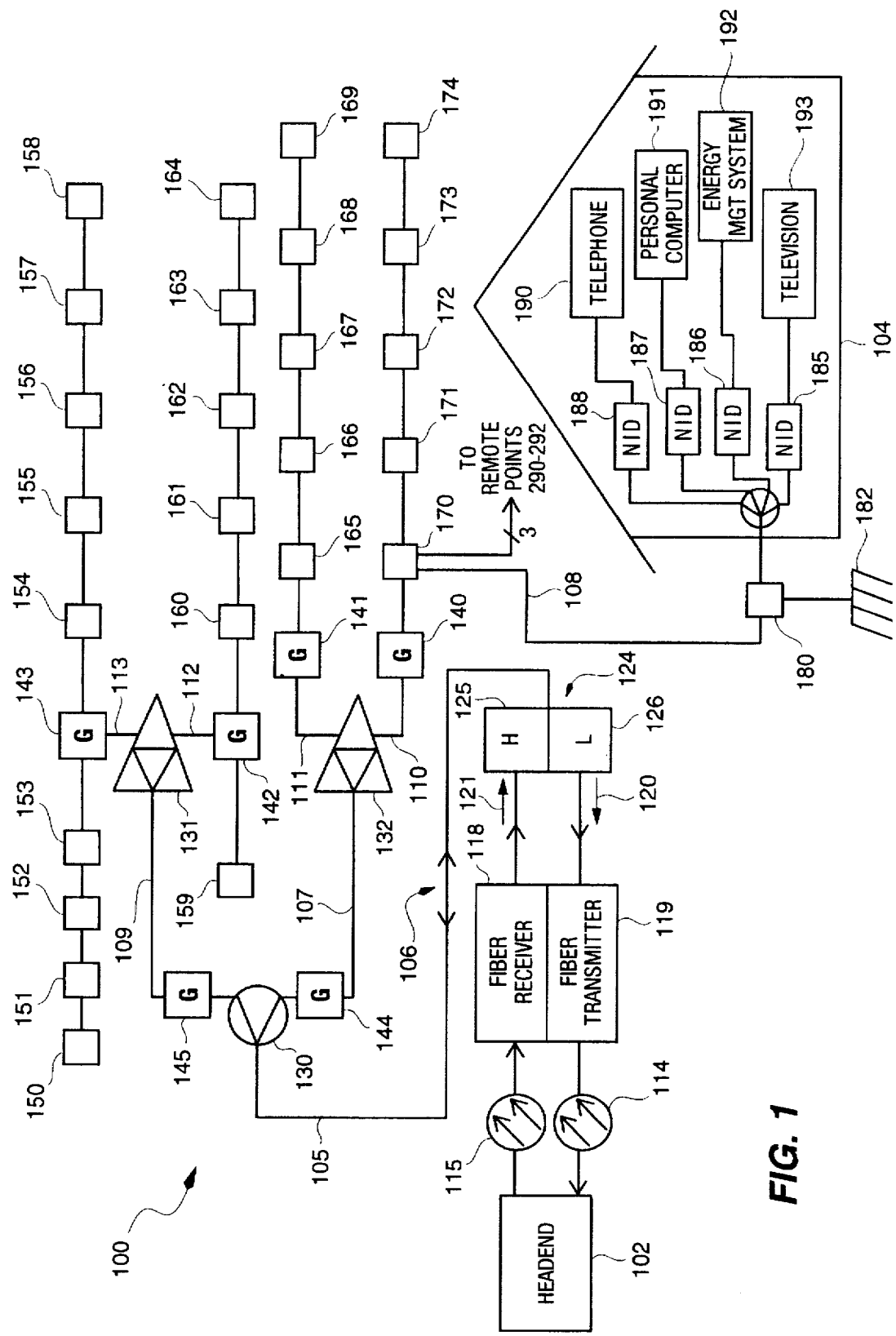
FIG. 1 illustrates a bidirectional communication network in block diagram form.

Bidirectional Cable Network—FIG. 1

FIG. 1 illustrates the primary components of a bidirectional cable network 100 having a hybrid fiber-coax tree-and-branch network topology commonly found in the industry. The bidirectional cable network 100 includes a headed 102 and at least one remote point 104 having a bidirectional communication path 106 therebetween. Headed 102 could also be a distribution hub. The tree-and-branch network topology is illustrated in FIG. 1 by a primary trunk 105 that branches into secondary trunks 107 and 109 which branch into distribution branches 110–113 and finally individual drop lines such as drop line 108.

Each distribution branch 110–113 contains a plurality of network taps 150–174 that each provide a plurality of drop line cables such as drop line 108 to connect remote point 104 to distribution branch 110. A single network tap 170, for example, typically supports 2, 4 or 8 drop lines to a number of remote points. A network tap is well known and available in the cable industry and typically includes a first directional coupler to tap the distribution branch cable, a second directional coupler to produce the desired number of drop lines exiting the network tap, and an optional power passing circuit to jump the first directional coupler so that power can be delivered to other active devices. Although network tap 170 can support more than one drop line only one drop line 108 is illustrated to connect remote point 104 to distribution branch 110.

The bidirectional communication path 106 is a single physical cable that simultaneously carries broadband RF signals in both directions between the headed 102 and a plurality of remote points such as remote point 104. Simultaneous bidirectional communication on a single physical wire is accomplished by dividing the RF spectrum into a first frequency range and a second frequency range. The first frequency range carries signals in a first downstream or a forward path direction 121 from the headed 102 signal source to each of a plurality of remote points such as remote point 104. The second frequency range carries signals in a second upstream or return path direction 120 from each remote point, such as remote point 104, back to headed 102. For example, a typical bidirectional communication path 106 might include a first frequency range at or about 54–750 MHZ for carrying signals in the forward path direction 121 and a second frequency range at or about 5–40 MHZ for carrying signals in the return path direction 120.

Bidirectional communication path 106 can be a coaxial cable, fiber optic cable, or a hybrid fiber-coax system, all which are commonly used and available in the industry. FIG. 1 illustrates a hybrid fiber-coax network where a fiber optic cable extends from headed 102 through fiber optic forward cable 115 and fiber optic return cable 114, and fiber receiver and transmitter 118 and 119 using apparatus commonly known and available in the cable industry. Coaxial cable is regularly used in portions of the network nearer the distribution branches 110–113 toward the remote ends. Diplex filter 124 filters and joins the first and second frequency ranges in bidirectional communication path 106 onto a single physical cable. The filtering is accomplished with high-pass filter 125 for the first high frequency range, and low-pass filter 126 for the second low frequency range. Diplex filters are well known and available in the cable industry.

Remote point 104 is connected to distribution branch 110 at network tap 170 by way of drop line 108. Drop line 108 is grounded at ground block 180 by an earth ground 182 to protect the network 100 and remote point 104 from lightning strikes. Drop line 108 terminates at Network Interface Devices (NID) 185–188. Each NID 185–188 is the network interface for a piece of terminal equipment 190–193 located in remote point 104. NID 185–188 details are discussed in further detail in the text accompanying FIG. 4. Types of terminal equipment 190–193 can include, but are not limited to, voice, data, and/or video telephone equipment 190, personal computing equipment 191, energy management equipment 192 for heating/cooling systems and/or utility service meters, and television equipment 193. Types of terminal data that are better suited for random or contention based transmissions include those that typically produce bursts of data at irregular intervals such as personal computing equipment 191, energy management equipment 192, and certain types of interactive television activities. User/subscribers that do not wish to replace their traditional Set Top Box (STB) with NID 185 are fully supported by the undesirable energy suppression system of the present invention as discussed in the text accompanying FIGS. 3–4.

Directional coupler 130 is a commonly used device that splits and joins branches in the bidirectional cable network 100. For example, directional coupler 130 splits primary trunk 105 into secondary trunks 107 and 109 so that both secondary trunks 107 and 109 contain all forward information. Similarly, directional coupler 130 joins secondary trunks 107 and 109 into primary trunk 105. Amplifiers that also contain directional couplers are illustrated by directional coupler/amplifiers 131–132.

Return gate devices 140–145 contain the necessary control circuitry to facilitate unrestricted signal flow of subscription signals in the forward path direction 121 and return signal flow in the return path direction 120. Return gate devices 140–145 are ideally located in primary and secondary positions for switches or for switches or return gates in the return path within bidirectional cable network 100. Because a single return gate device 140 can only suppress unwanted energy that enters the return path in the remote point side of the return path, a secondary return gate device 144 can optionally be used to provide an additional suppression point further toward the headed from primary return gate device 140. Therefore, not only do return gate devices 140–145 provide the return gate apparatus for intermittently isolating the respective distribution branches except to allow transmitted return path signals to pass, any return gate device 140–145 can be used to continuously isolate its respective distribution branch if unwanted energy originating from a remote point on the branch is so severe so as to threaten network integrity throughout bidirectional cable network 100.

Figure 2:
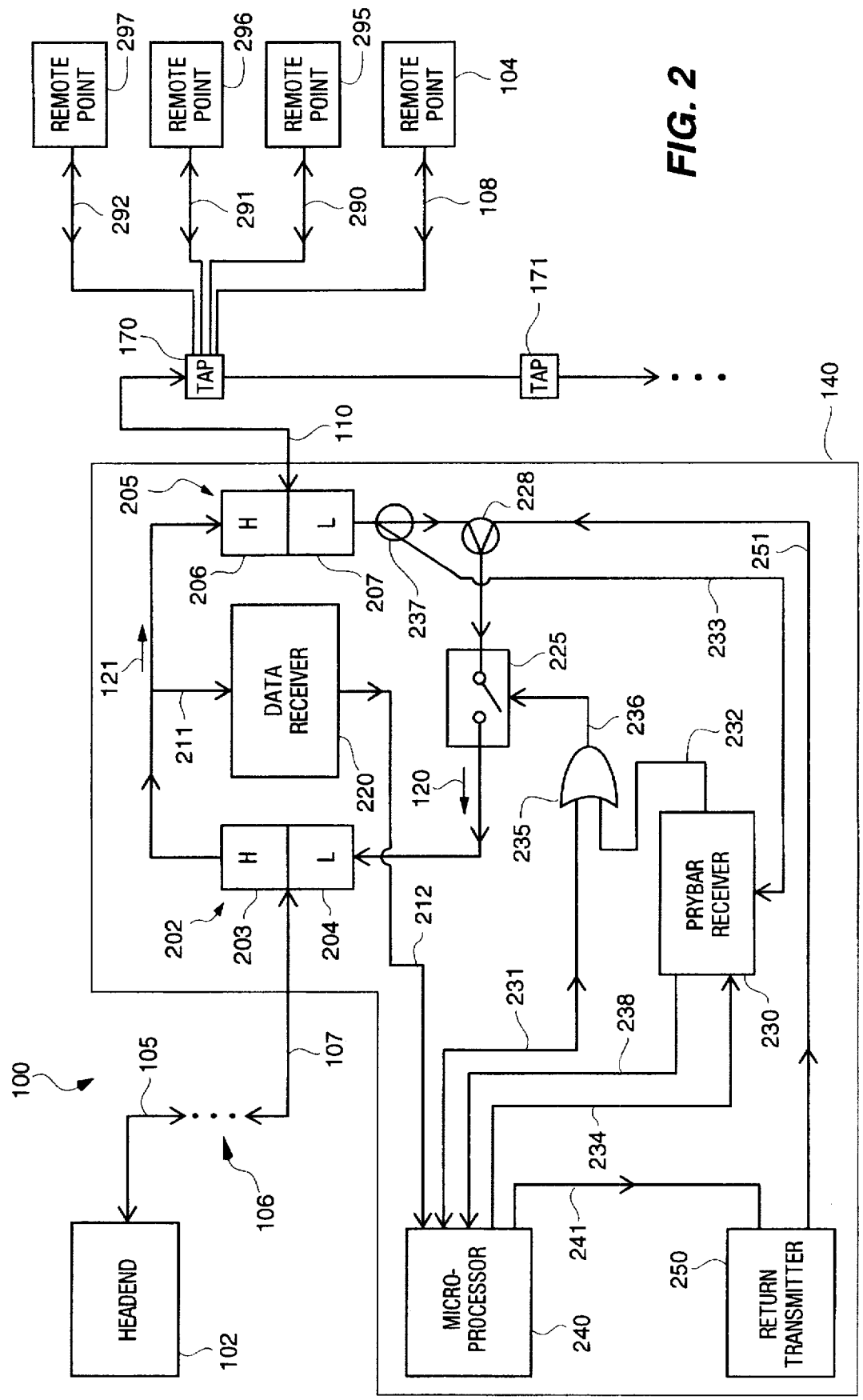
FIG. 2 illustrates a first return gate device embodiment in block diagram form.

Return Gate Embodiment—FIG. 2

FIG. 2 illustrates the details of a return gate as can be found in any of the return gate devices 140–145. There is no functional difference between a return gate device located in a primary, secondary, or any other position in bidirectional cable network 100. Return gate device 140 is connected to headed 102 by way of primary trunk 105 and secondary trunk 107 portions of bidirectional communication path 106. Return gate device 140 is connected to network taps 170–171 by way of distribution branch 110. Network tap 170 illustrates the drop line connectivity to a plurality of individual remote points 104 and 295–297 by way of drop lines 108 and 290–292. Each remote point 104 and 295–297 believes that it has a contention based connection with headed 102. Return gate device 140 contains individual components that are well known and available in the cable industry. Power for return gate 140 is typically 60 volt 60 cycle power that can be taken from the lowest frequency bands of a coaxial cable based bidirectional communication path 106. The return gate device 140 is also designed to withstand hostile outdoor environmental factors including, but not limited to, temperature, humidity, and lightning strikes, in any manner well known and practiced in the cable industry.

The headed 102 side of bidirectional communication path 106 enters return gate device 140 at diplex filter 202. Forward path 121 is separated from bidirectional communication path 106 by high-pass filter 203. Data receiver input line 211 taps the forward path 121 for data receiver 220 so that status monitoring, switch testing, switch use, timing, and other administrative information and commands can be extracted from the forward path for use by the return gate 225. Data on forward path 211 can be Frequency-Shift Keyed (FSK), Quadrature Amplitude Modulated (QAM), or Vestigial Sideband (VSB) modulated for data receiver 220. The forward path 121 rejoins distribution branch 110 by way of high-pass filter 206 of the diplex filter 205. The bidirectional output of diplex filter 205 is the distribution branch 110 which delivers the forward path part of bidirectional communication path 106 to the network taps 170–171. Network tap 170 provides bidirectional drop line 108 and 290–292 connections to remote points 104 and 295–297.

The return path 120 portion of distribution branch 110 is separated by low-pass filter 207 of diplex filter 205 and becomes the first of two inputs to directional coupler 228. The second input to directional coupler 228 is the return transmitter output 251 from return transmitter 250. The return path 120 output from directional coupler 228 passes through the single pole single throw gate 225 and rejoins bidirectional communication path 106 by way of low-pass filter 204 of the diplex filter 202. Return gate 225 opens and closes to disconnect and connect the return path substantially concurrently with a transmission by one of the remote points 104, 295–297 in response to a prybar signal detected by prybar receiver 230. The prybar signal is delivered to prybar receiver 230 by way of lead 233 that is split off of return path 120 at directional coupler 237. The prybar signal on lead 232 from prybar receiver 230 is combined with a status monitoring enable signal on status monitoring lead 231 from microprocessor 240 by OR-gate 235. The output on gate enabling lead 236 from OR-gate 235 enables return gate 225 to allow a transmission on return path 120. Prybar receiver enable lead 234 from microprocessor 240 can be used to disable prybar receiver 230. In one embodiment the return gate 225 should ideally be terminating in 75 ohms when open and the return path is disconnected.

In operation, it is expected that the bidirectional cable network 100 may be under attack at any time by pirates whose purpose may include gaining free access to network 100 or merely to disrupt service in the network 100. For this reason, a transmission from a pirate may be considered as undesirable energy in network 100 that must be controlled. Thus, it may be necessary to disable the prybar receiver 230 to thwart pirates or to terminate a distribution branch if no remote point services are deployed downstream from return gate device 140. Return gate device 140 can also be used to detect attempts by pirates to gain access to the network 100 or to remotely detect defective NID devices in remote points. Such detection can be accomplished by having the return gate device 140 monitor the busy, clear and jammed status of the return path that is delivered on the forward path, while monitoring the prybar receiver 230 activity. Any attempt to enable the return gate 225 while the return path 120 is busy will be detected by the return gate device 140. An alarm can triggered and/or a report transmitted to the headed 102 over a status monitoring channel over the return path.

A prybar signal, otherwise known as a gate enabling signal, can be an access code that is transmitted on the forward path from the headed to a NID in each remote point as a public or secret code. A secret code may also be an encrypted code. The prybar signal may be a frequency used to enable a return gate, or the prybar signal may be a digital code similar to the programmable digital codes on a digital garage door opener. Each return gate device in the bidirectional communication path of a remote point may also receive a prybar signal access code so that the signal access code for a single remote point or all of a plurality of remote points that share a common code, can be updated or otherwise changed so that the return gate will only respond to a new updated or otherwise changed code rather than an old code, thus further frustrating would-be pirates.

Microprocessor 240 contains the operating system that controls all components and activities of the return gate device 140. Specific microprocessor 240 functions include, but are not limited to, managing remote point address information, prybar codes responding to headed 102 commands, testing return gate 225 isolation capability, testing power levels on the forward and return paths 121 and 120, reporting the status of the return gate device 140, and enabling the prybar receiver 230. Testing the isolation of return gate 225 includes instructing OR-gate 235 to hold return gate 225 open while return transmitter 250 transmits a test signal on return transmitter lead 251. Testing power levels in the system helps identify and locate breaks or bad connections in the network.

Return transmitter 250 is used to prepare and transmit diagnostic signals and/or administrative messages to the headed 102 by way of return transmitter lead 251, return gate 225, and return path 120. Return transmitter 250 is used as needed for return gate device 140 administrative communication purposes or for return gate isolation testing as previously discussed.

The advantage of the return gate device 140 embodiment in FIG. 2 is that a single return gate 225 can provide testing and time division multiplexing service to all remote points within the return gate device's distribution branch. In the present illustration, the distribution branch of return gate 140 includes distribution branch 110 and any network tap and remote point connected thereto. The disadvantage, however, is that if one remote point in distribution branch 110 begins uncontrolled transmitting or is the source of undesirable energy on return path 120, all remote points 104, 295–297 served by return gate device 140 can be adversely affected while the return gate 225 is closed. However, the headed 102 will know that the source of the problem is in the distribution branch of return gate device 140 because of the identity of the data from remote points 104 and 295–297, or because the activity of the prybar receiver 230 is known through an activity lead 238 to microprocessor 240.

A backward compatibility issue exists between set top boxes that use the return path 120 and the access restricting return gate devices 140. The set top boxes must be polled periodically to extract data such as pay-per view purchases. This can be done when network usage is low, such as late at night, by closing all return gates 225 in all return gate devices 140 for the duration of the polling by means of OR-gate 235.

Figure 3:
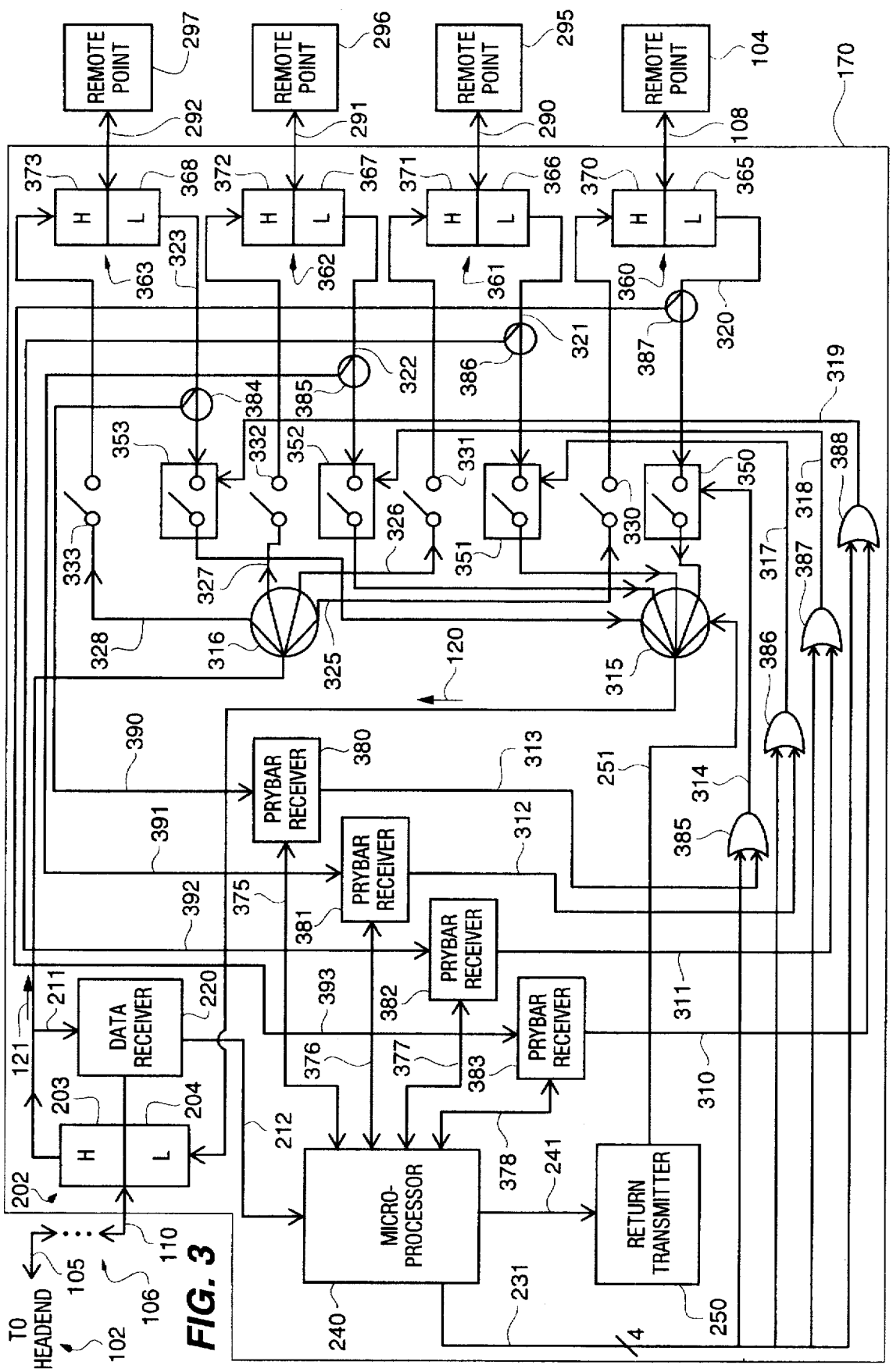
FIG. 3 illustrates a second return gate device embodiment in block diagram form.

Alternative Return Gate Embodiment—FIG. 3

FIG. 3 illustrates the details of a return gate device embodiment where there is a return gate 350–353 dedicated to each individual remote point 104, 295–297. The FIG. 3 embodiment can be implemented in place of return gate devices 140–143 of FIG. 1 or in conjunction with any combination of the return gate devices 140–145. Central to the FIG. 3 embodiment is that there is a return gate 350–353 dedicated to each drop line 108 and 290–292 to each remote point 104 and 295–297 respectively. In addition, each single pole single throw return gate 350–353, the prybar receivers 380–383, and supporting circuitry in FIG. 3 are located within a network tap such as network tap/return gate device 170 which serves remote points 104 and 295–297 by way of drop lines 108 and 290–292. Each of the components in network tap/return gate device 170 serve a function similar to their counterpart described in FIG. 2 and are widely used and readily available from manufacturers and vendors in the cable industry.

Return gate device 170 is connected to distribution branch 110 as previously illustrated in FIGS. 1 and 2. Power for return gate device 170 is typically 60 volt 60 cycle power can be taken from the lowest frequency bands of a coaxial cable based bidirectional communication path 106. As with other outdoor return gate devices, return gate device 170 is designed to withstand hostile outdoor environmental factors including, but not limited to, temperature, humidity, and lightning strikes, in any manner well known and practiced in the cable industry.

The forward path 121 signal from the headed 102 side of bidirectional communication path 106 enters return gate device 170 at diplex filter 202. Forward path 121 is separated from bidirectional communication path 106 by high-pass filter 203. Data receiver input line 211 taps the forward path 121 on behalf of data receiver 220 so that status monitoring, control, and other information and general administrative information can be extracted for use by return gate device 170. Data on forward path 121 for the data receiver can be Frequency-Shift Keyed (FSK), Quadrature Amplitude Modulated (QAM), or Vestigial SideBand (VSB) modulated. The forward path 121 is split four ways by directional coupler 316 into forward paths 325–328. Forward paths 325–328 each have a forward path connect/disconnect gate 330–333 which is controlled by the headed 102 to connect or disconnect service to individual remote points 104 and 295–297 without requiring an on site service call. Each forward path 325–328 rejoins its respective bidirectional drop line 108 and 290–292 by way of high-pass filters 370–373 of the diplex filters 360–363. The bidirectional drop lines 108 and 290–292 connect each remote point 104 and 295–297 to the network so that each remote point 104 and 295–297 believes it has a return gate controlled connection to headed 102.

The return path 320–323 portion of drop lines 108 and 290–292 are separated from drop lines 108 and 290–292 by low-pass filters 365–368 of diplex filters 360–363. The return paths 320–323 pass through single pole single throw return gates 350–353. Each gate 350–353 opens and closes in response to the respective prybar receiver 380–383 command as delivered by prybar output control leads 310–313. The return paths 320–323 and return transmitter lead 251 are joined into a single return path 120 by way of directional coupler 315. Each prybar transmission on respective prybar input leads 390–393 is directed to respective prybar receiver 380–383. Alternatively, the input prybar signals may be so coded on a single commonly used prybar lead to cause one prybar receiver to close any one of the return gates 350–353. Return path 120 rejoins forward path 121 in bidirectional communication path 106 by way of low-pass filter 204 of the diplex filter 202. Prybar receivers 380–383, data receiver 220, microprocessor 240, and return transmitter 250 serve the same purpose and function in the same manner as illustrated and described in FIG. 2 except that the isolation of the return gates 350–353 cannot be tested by the return transmitter 250 in the illustrated configuration unless a return transmitter 250 lead is connected to each return gate 350–353. Respective activity leads 375–378 between prybar receivers 380–383 and microprocessor 240 provides information on return gate usage for status monitoring purposes. Activity leads 375–378 can also be used to enable/disable respective return gates 350–353.

The advantage of return gate device 170 is that each remote point 104 and 295–297 has a dedicated return gate 350–353 to better isolate each remote point individually. Additional advantages include, but are not limited to, sharing a single power supply for multiple forward gates 330–333, return gates 350–353, network tap/return gate device 170 housing, and shared gate control components 220, 240, and 250. An example of another circuit function that can be included in a shared housing is an interdiction device that can be used to deny service on forward path carriers by jamming the carriers with RF energy.

Figure 4:
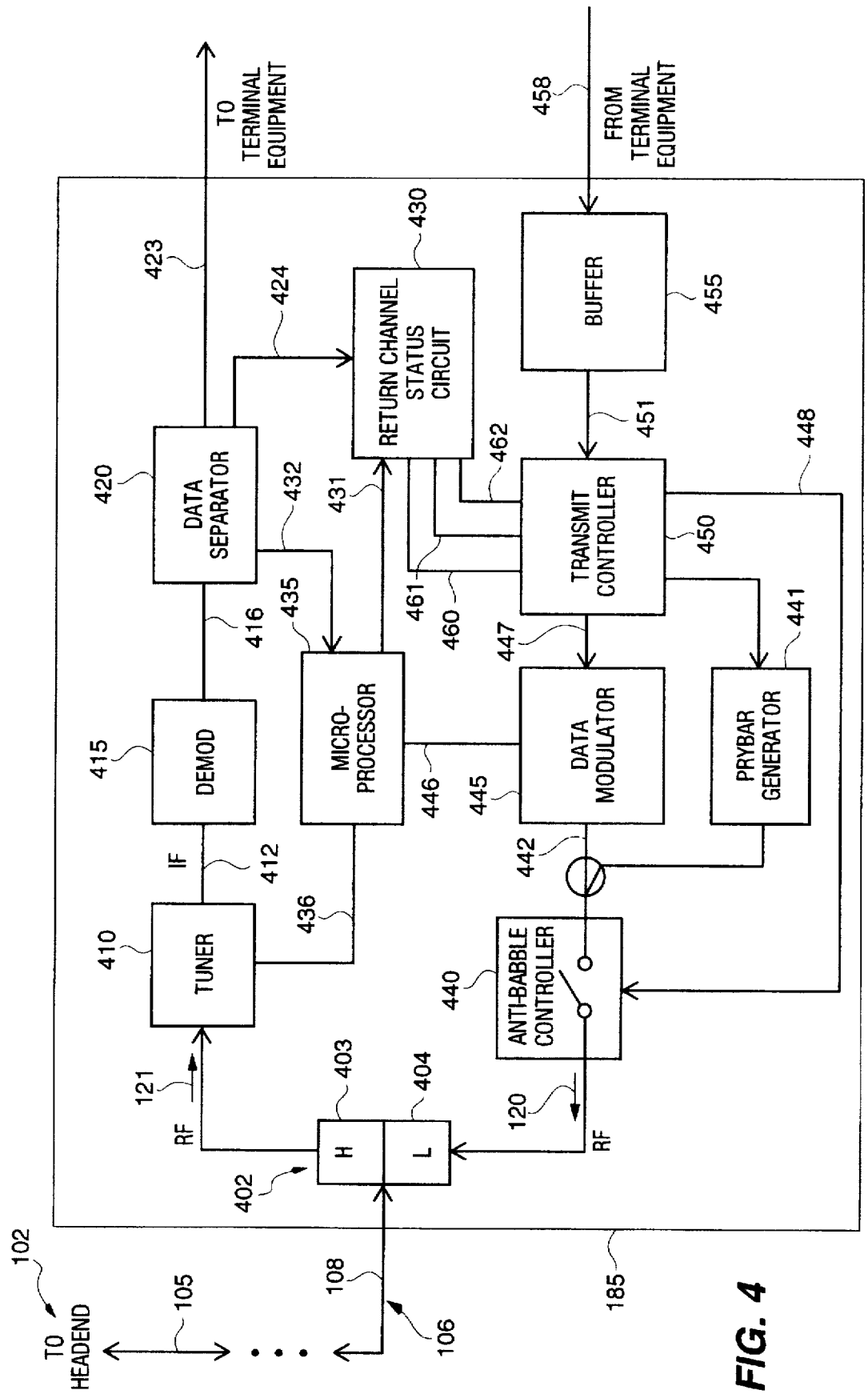
FIG. 4 illustrates a remote point in block diagram form.

Network Interface Device—FIG. 4

FIG. 4 illustrates a Network Interface Device (NID) such as NID 185 previously illustrated within remote point 104 of FIG. 1. Drop line 108 connects NID 185 to headed 102 by way of the bidirectional communication path 106 structure previously described. NID 185 is also connected to the user/subscriber's terminal equipment by way of forward path 423 and return path 458.

The forward path 121 portion of drop line 108 is separated from drop line 108 by high-pass filter 403 of the diplex filter 402. The RF signal on forward path 121 from high-pass filter 403 is the input to tuner 410. Tuner 410 locks onto the predetermined RF frequency band intended for use by the particular type of terminal equipment attached to NID 185, and converts the RF signal to an Intermediate Frequency (IF) output 412 under the control of microprocessor 435. Microprocessor 435 is connected to tuner 410 by way of microprocessor control lead 436. Additional tuner 410 functions besides frequency conversion include, but are not limited to, filtering the digital data carrier of forward path 121, and providing automatic gain control of the IF output 412.

IF output 412 is demodulated by demodulator 415 to extract the data from the IF carrier frequency. Baseband data on lead 416 from demodulator 415 is separated into return channel status and forward path data components by data separator 420. The forward path data output from data separator 420 is delivered to the attached terminal equipment by way of forward path data lead 423. Data separator 420 may also provide decryption of the forward data if it has been encrypted for security reasons. The user/subscriber's terminal equipment may also receive a clock reference from data separator 420 if desired.

Return path status data from data separator 420 is delivered to return channel status circuit 430 by way of status input lead 424. Return channel status circuit 430 receives authorization and general return path control information from microprocessor 435 by way of microprocessor control lead 431. Return channel status circuit 430 provides signals to the transmit controller 450 indicating that the return channel 120 is clear to send, jammed, or busy by way of clear lead 460, jammed lead 461, and busy lead 462 respectively. Transmit controller 450 directs and coordinates the data modulation by data modulator 445, anti-babble controller 440, and prybar signal generator 441, in synchronization with a data frame transmission on return path direction 120.

Microprocessor 435 contains the operating system that controls data modulator 445 by way of lead 446, in addition to all components and activities of NID 185. Specific microprocessor 435 functions include, but are not limited to, managing data addressed to the remote point, responding to headed 102 commands, and taking actions based on the status of the network 100 generally and the NID 185 specifically, and self-testing. The operating system for microprocessor 435 may be stored in Read Only Memory (ROM) or it may be down-loaded from the headed 102 or any other source.

Return path data from a user/subscriber's terminal equipment is delivered to NID 185 by way of return path data lead 458. The return path data is buffered in data buffer 455 until a data block or frame is available for transmission by transmit controller 450. Buffer output on lead 451 is input to transmit controller 450. The transmit controller 450 can also be used to randomize the data as baseband burst data, or to provide interleaving or Forward Error Correction (FEC). Encoded output on lead 447 is a baseband signal that is modulated onto the appropriate carrier frequency by data modulator 445. Data modulator 445 may use any type of modulation that is suitable for transmitting in a frame or block including, but not limited to, Orthogonal Frequency Division Multiplexing (OFDM), QAM, VSB, or CDMA modulation. Data modulator 445 may also regulate the return path transmission power levels under command of the headed 102. RF output on lead 442 from data modulator 445 can be optionally regulated by anti-babble controller 440 subject to timing control from transmit controller 450 over timing control lead 448. Anti-babble controller 440 is optionally used so that the return path 120 is not jammed in the event NID 185 fails to control return path transmissions. Return path output direction 120 from anti-babble controller 440 is reunited with the forward path direction 121 of the bidirectional communication path 106 by way of low-pass filter 404 of the diplex filter 402. Prybar transmitter 441 generates the prybar signal to enable the gate in anti-babble controller 440 for a transmission from data modulator 445. The prybar signal may be an out-of-band analog or digital transmission. Alternatively, the prybar transmitter 441 can recognize a valid data transmission and operate on the data itself to enable the gate in anti-babble controller 440.

Figure 5:
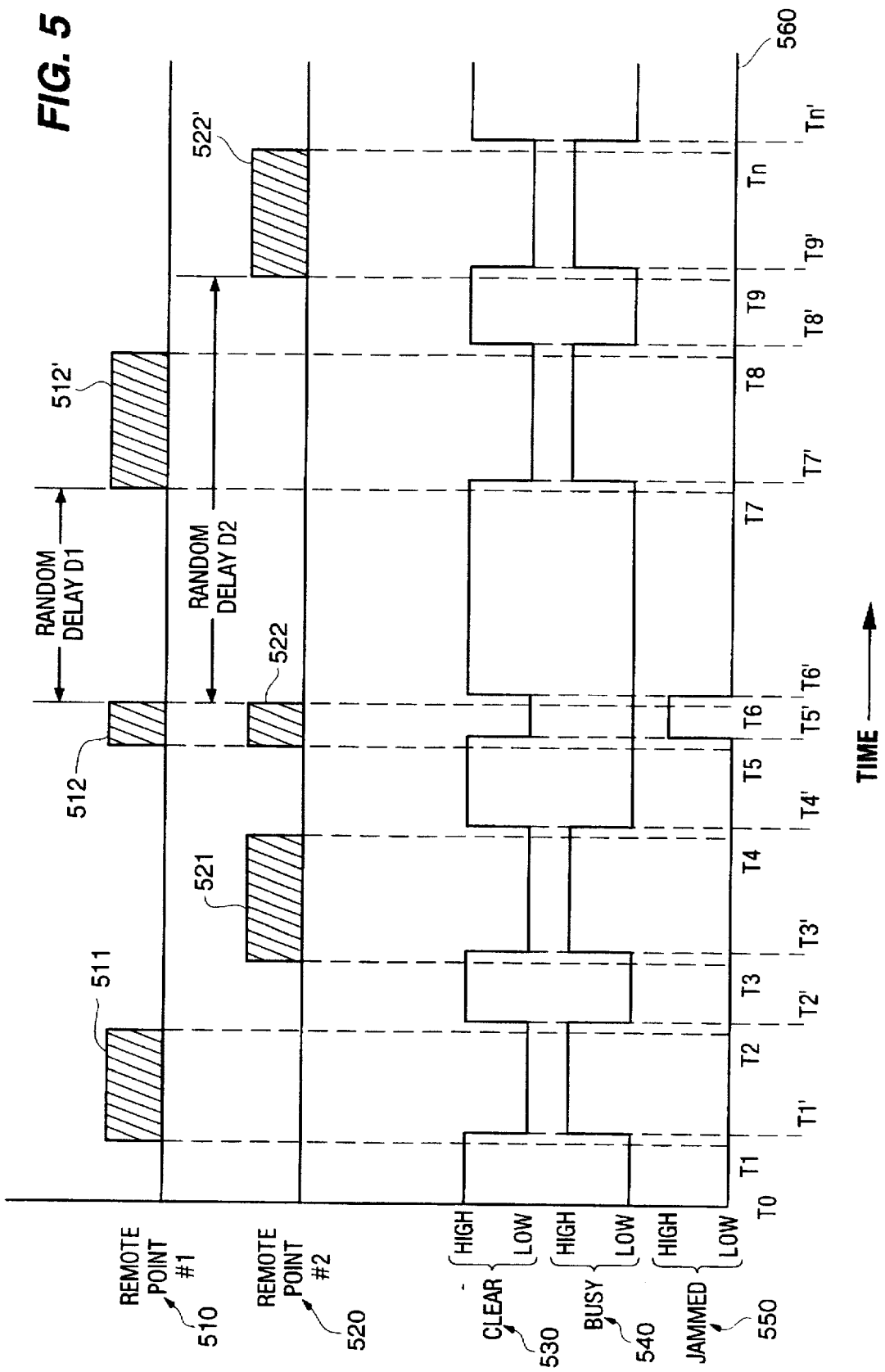
FIG. 5 illustrates a timing diagram for two remote point transmissions.

Return Path Transmission Timing Illustration—FIG. 5

FIG. 5 illustrates a return path transmission timing example for first and second remote points 510 and 520. Return path status on the forward path is illustrated by high and low identifiers clear 530, busy 540, and jammed 550. The horizontal axis of the FIG. 5 table is time 560 increasing from T0 to Tn.

At time T0 the return path status is clear for remote points 510 and 520. At time T1 remote point 510 begins a transmission 511 while the clear status indicator 530 is high which indicates that the return path transmission channel is clear-to-send. The gate enabling signal for remote point 510 slightly precedes transmission 511 at time T1. At time T1' the busy status indicator goes high and the clear status indicator goes low as sensed by the remote points 510 and 520. The time difference between T1 and T1' is the time required for the transmission from remote point 510 to be detected by headed 102, and for an updated status signal to travel on forward path 120 to remote points 510 and 520. The transmission 511 lasts until time T2 during which remote point 520 cannot and/or will not transmit because the busy status indicator 540 is high. At the end of transmission 511 at time T2 the clear status indicator 530 goes high and the busy status indicator 540 goes low simultaneously at time T2'.

Similarly, at time T3 remote point 520 begins a transmission 521 while the clear status indicator 530 is high which indicates that the return path transmission channel is clear-to-send. The gate enabling signal for remote point 520 precedes transmission 521 at time T3. At time T3' the busy status indicator 540 goes high and the clear status indicator 530 goes low as sensed by remote points 510 and 520. The transmission 521 lasts until time T4 during which remote point 510 cannot and/or will not transmit because the busy status indicator 540 is high. At the end of transmission 521 at time T4 the clear status indicator 530 goes high and the busy status indicator 540 goes low simultaneously at time T4'.

At time T5 both remote points 510 and 520 attempt simultaneous transmissions 512 and 522 while the clear status indicator 530 is high. Transmissions 512 and 522 and their gate enabling signals collide at time T5 so that the clear status indicator 530 goes low and the jammed status indicator 550 goes high at time T5'. Both remote points 510 and 520 cease transmitting at time T6 and wait for a random time delay D1 and D2 respectively. The jammed status indicator 550 returns to low and the clear status indicator 530 goes high at time T6'. Random delay D1 happens to expire first and remote point 510 attempts retransmission 512' at time T7 while the clear status indicator 530 indicates clear. Retransmission 512' is successful so that clear status indicator 530 goes low and busy status indicator 540 goes high at time T7'. Retransmission 512' stops at time T8 so that clear status indicator 530 goes high and busy status indicator 540 goes low at time T8'. In the mean time random time delay D2 expires at time T9 and remote point 520 attempts to retransmission 522' at time T9 while the clear status indicator 530 indicates clear. Retransmission 522' is successful so that clear status indicator 530 goes low and busy status indicator 540 goes high at time T9'. Retransmission 522' stops at time Tn so that clear status indicator 530 goes high and busy status indicator 540 goes low at time Tn'. Transmissions continue in the manner described above for each of the plurality of remote points in the bidirectional cable network 100. In another embodiment, a transmission could be required to start at the beginning of pre-assigned time slots.

Figure 6:
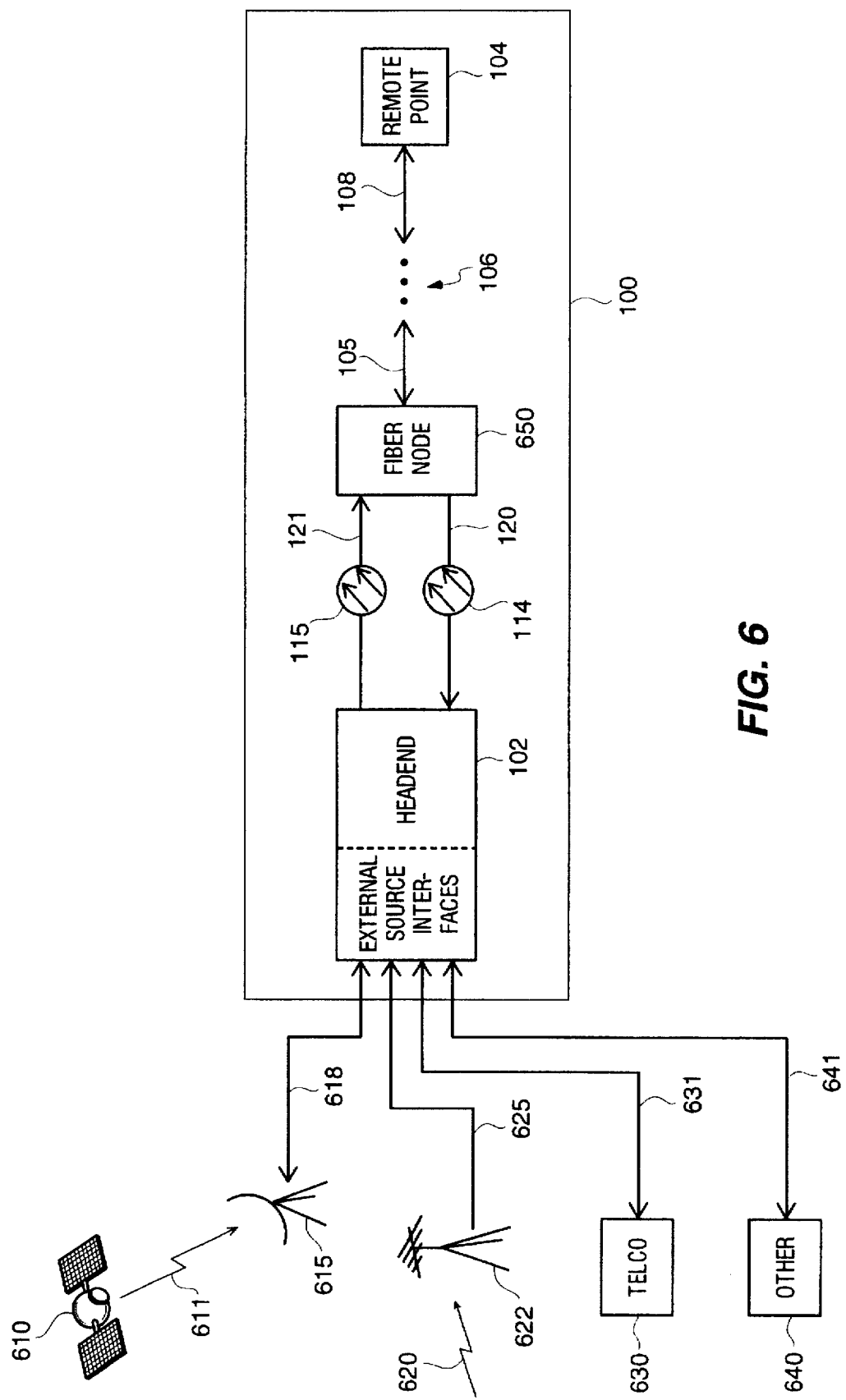
FIGS. 6–7 illustrate headed details in block diagram form.
Figure 7:
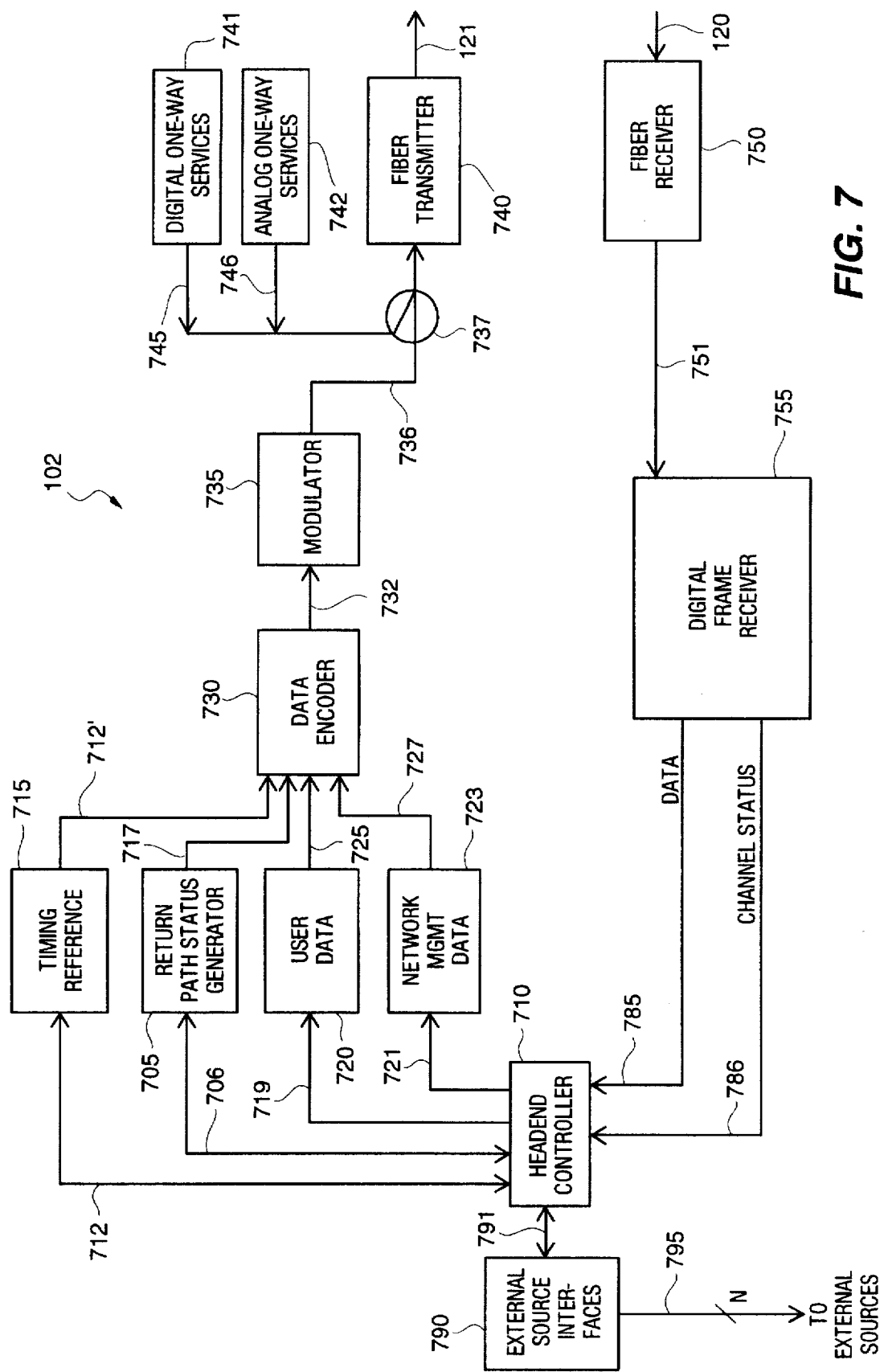

Headed Details—FIGS. 6–7

FIG. 6 illustrates the headed 102 portion of bidirectional cable network 100. Headed 102 is the origination/collection point for forward path 121 signals and the termination/collection point for return path 120 signals to and from remote point 104. Headed 102 is also the interface for transmitting and receiving data to and from data sources external to bidirectional cable network 100 in a manner well known and practiced in the cable industry. Bidirectional cable network 100 activities and configurations between headed 102 and remote point 104 are the same in FIG. 6 as previously described and illustrated in FIGS. 1–5. Data sources external to bidirectional cable network 102 include, but are not limited to, satellite transmission 611 from satellite 610 by way of satellite antenna 615 and satellite lead 618, radio wave transmission 620 delivered by way of radio wave antenna 622 and radio wave lead 625, telephone company central office switch 630 by way of telephone lead 631, and other external sources, such as the internet 640 by way of external lead 641.

FIG. 7 illustrates an example of a headed 102 for bidirectional cable network 100. Headed controller 710 receives data from external sources from external source interfaces 790 by way of external source bus 791. Any number of external sources may by connected to external source interfaces 790 as illustrated in FIG. 6. Headed controller 710 outputs the external source data on output data lead 719 to user data staging area 720. Headed controller 710 coordinates timing for the network with timing reference 715 by way of timing leads 712 and 712'. Timing reference 715 can be any type of high precision oscillator such as a crystal oscillator that is required to achieve high levels of network accuracy. Headed controller 710 also coordinates network management with network management data device 723 by way of network management leads 721 and 727. Headed controller 710 also coordinates return path status with return path status generator 705 by way of status leads 706 and 717.

Data on the forward path 121 is a continuous carrier such as 64 QAM. However the continuous carrier may be shared by many data paths destined for different end points. Asynchronous Transfer Mode (ATM), Moving Picture Experts Group (MPEG) transport stream, XDQRAP and TDMA are among the protocols that allow multiple access on a single high-speed carrier. Data encoder 730 accepts input from timing reference 715, return path status generator 705, user data staging area 720, and network management data staging area 723 by way of respective leads 712', 717, 725, and 727. Data encoder 730 encodes the data from each lead for transmission on a forward path carrier. Any timing markers needed by a contention based system are assigned by the headed controller 710 for input to data encoder 730 and timing reference 715. Encoded baseband data is output on encoder output 732 to frequency modulator 735 for modulation onto a carrier frequency. The modulated carrier frequency is output on modulator output lead 736 for transmission by fiber optic laser transmitter 740 onto the forward path 121 of the bidirectional cable network 100. Additional one-way digital services 741 and one-way analog services 742 are output on leads 745 and 746 respectively for joining with modulated output lead 736 by way of directional coupler 737. Types of one-way digital services 741 include, but are not limited to, digital music and computer games. Types of one-way analog services 742 include, but are not limited to, television channels. A transmission carrier in the United States, for example, may occupy a 6 MHz channel however any other non-standard bandwidth may be used.

Transmissions from a remote point on return path 120 are received by fiber optic laser receiver 750 and output on receiver output lead 751 to digital frame receiver 755. The digital frame receiver 755 receives the frames of data from the transmitting remote point and presents the error-corrected demodulated data to the headed controller 710 by way of data lead 785. In an alternative embodiment, the digital frame receiver 755 could also monitor prybar signals for authentication and generate the return channel status signals for the downstream path on channel status lead 786. In another alternative embodiment, the gate enabling signal may optionally be removed from the data transmission by the last return gate device having an enabled gate for the transmission from a transmitting remote point. Removing the gate enabling signal may be done to conserve bandwidth.

Among the important network management and maintenance tasks performed by the headed controller 710 and transmitted through the network as network management data on forward data carriers includes, but is not limited to, sending return channel status, identifying problem points in the network, connecting and disconnecting subscriber service, house-keeping administrative functions, power level monitoring, and general status or network monitoring for remote points throughout the network. Network monitoring by the headed controller 710 is an important function. In addition to the normal provision of service, it is important to detect breaks in the shielding of the coaxial portion of the network. This is important inside the remote points because a break can interfere with the integrity of data transmitted from the affected remote point. In addition, a break in the shielding inside the clean part of the network can interfere with the data communications of many remote points.

One way to monitor the network for breaks is to passively listen for impulsive or continuous undesirable ingressing energy. This can be done with return gates by sending a brief duration false busy status indicator to inhibit both data transmissions and prybar signals. Second, return gates are ordered open in the area of interest and ordered closed in other areas by a command to the data receivers in the return gates. Third, the network is monitored for ingressing undesirable energy by passive listening. This monitoring can be done at times of the day when use is low, or alternatively, the false busy status indicator can be sent for such a short time such as about 100 ms or any other short time. Remote point devices may also be monitored by polling each remote point to assure path continuity.

Figure 8:
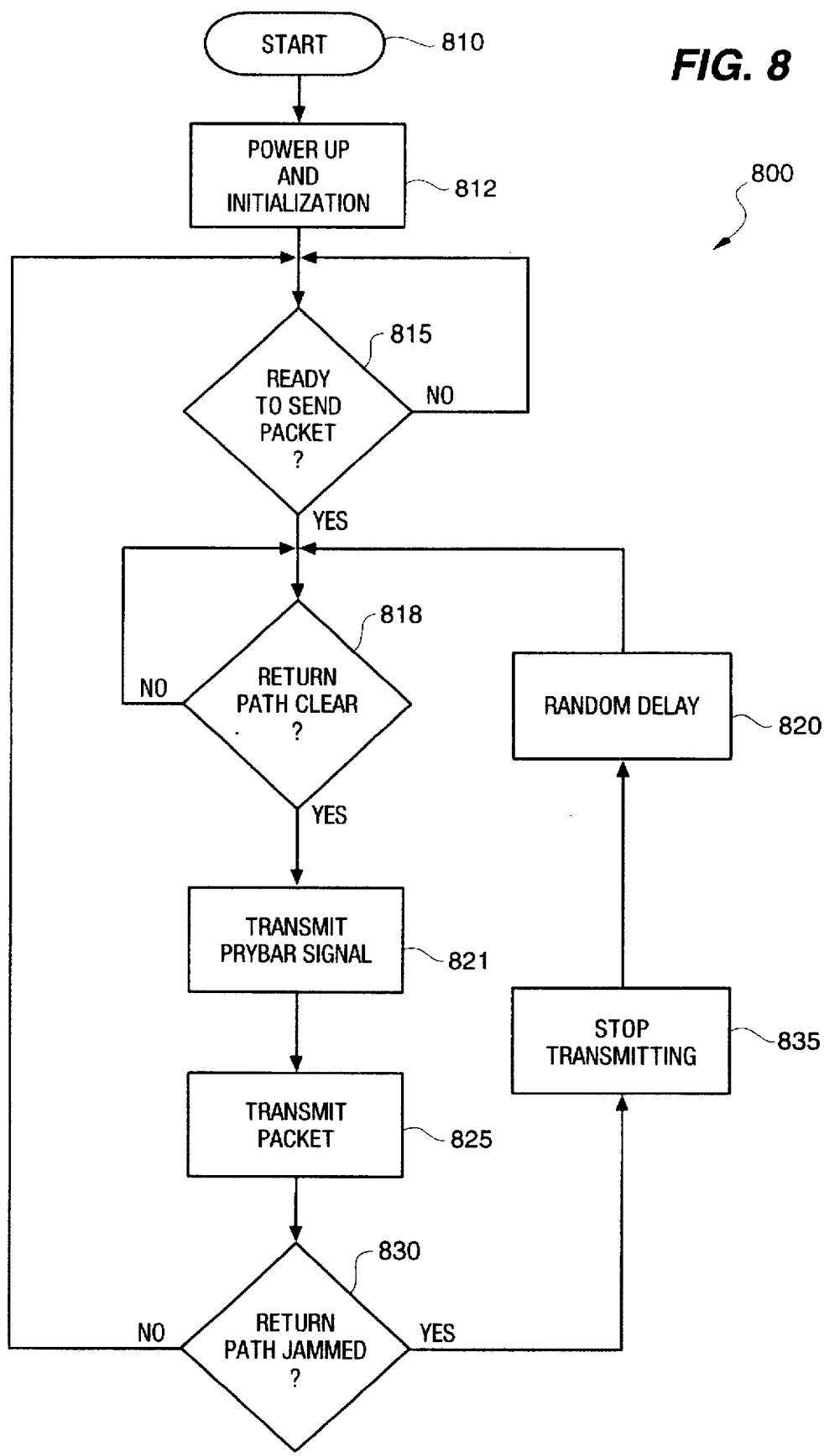
FIG. 8 illustrates operational steps in flow diagram form for a network interface device.

Network Interface Device Operational Flow—FIG. 8

FIG. 8 illustrates the operational flow 800 of a NID operating in a contention based manner in the bidirectional cable network 100. The operational flow is dependent on the continuous availability of real time return path status being provided on the forward path for receipt by each of the plurality of remote points concurrently.

NID processing starts at step 810 followed by NID power-up and/or initialization at step 812 as required depending on whether the device is being installed, restarted, or power is being recycled. When the NID is fully operational, processing continues at decision step 815. If a data packet is not ready to send on the return path 120 the NID waits until a data packet is available. If a data packet is ready to send on the return path 120 then the return path status is checked at decision step 818 to determine if the return path status of clear indicating that the return path is clear-to-send. If the return path status is not clear or otherwise busy, then the NID monitors the return path status for a clear status indicator. Alternatively, if the return path status suddenly becomes clear, the NID could transmit with a probability between 0 and 1. The probability could also be programmable by command from the headed. This prevents many users that decide to transmit during the busy time from jamming the return path on a clear.

If the return path status is clear, the NID transmits its prybar signal on the return path at step 821 so that the return gate on the return path is closed thereby providing a path for the data packet being transmitted in step 825. The prybar signal may be unique, or it may be generic depending on system security considerations. Additionally, the gate enabling signal or prybar code may be programed and sent over the forward path via a secure channel to the transmitting remote point and its local return gate devices. The length of time between the prybar signal transmission and the arrival of the data packet must be long enough to enable as many return gates are there are in series going back to the headed. Nominally the length of time to enable each gate is about 1 μs per gate.

If there are no collisions with another transmitting NID as would be indicated by a jammed status indicator at decision step 830 then the transmission is completed and processing continues at decision step 815 when the NID is ready to send another data packet. If there is a transmission collision with another NID as would be indicated by a jammed return path status, then the NID stops transmitting at step 835 and the NID enters a random length time delay state at step 820 prior to retransmitting the data packet when the return path status indicates clear. Thus, the transmission error detection and retransmission features of the contention based protocol typically occurs at a higher level on the protocol stack such as at an application layer also known as the data layer rather than at a transmission hardware layer also known as the physical layer.

Figure 9:
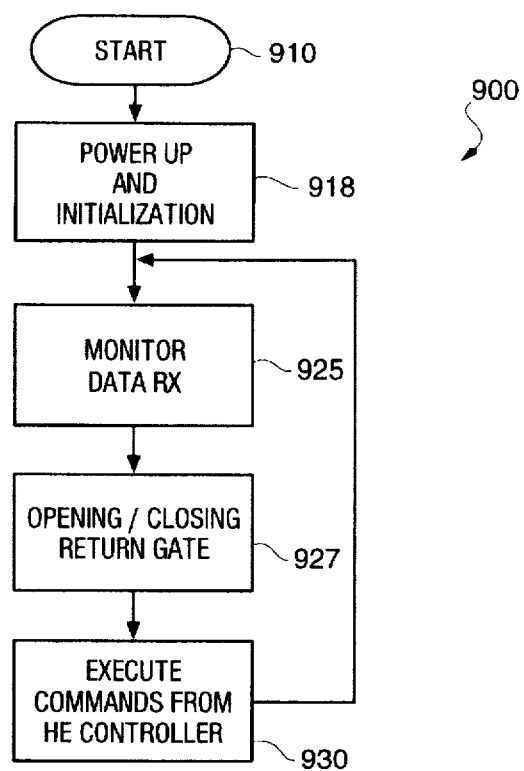
FIG. 9 illustrates operational steps in flow diagram form for a return gate device.
Figure 10:
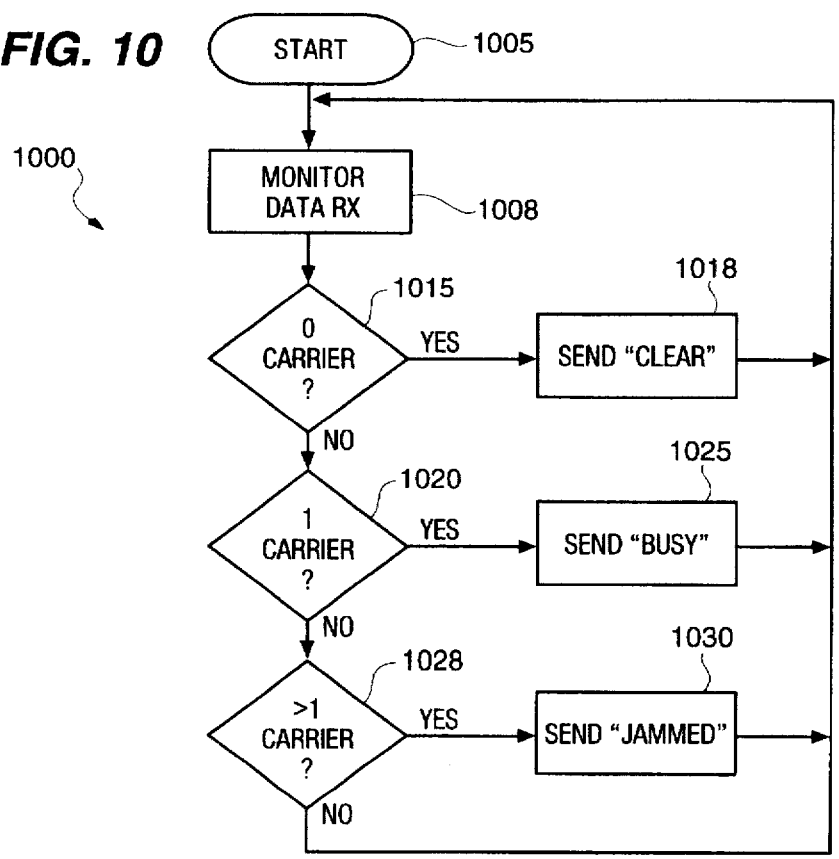
FIG. 10 illustrates the operational steps in flow diagram for a device that monitors return path status.

Return Path Device and Status Generation Operational Flow—FIGS. 9–10

FIG. 9 illustrates the operational flow 900 of a return gate device such as return gate device 140 in bidirectional cable network 100. Processing starts at step 910 and proceeds to power-up and initialization 918. Initialization includes, but is not limited to, clearing or resetting the return gate, prybar receiver, micro-processor, and return transmitter, and notifying the headed 102 of operational status. Once the return gate device is operational, a continuous process described below will proceed until the return gate device is no longer operational.

The prybar receiver 230 of the return gate device continuously monitors the return path 120 for transmissions from a remote point 104 or 295–297. A transmission from a remote point is accompanied by a prybar signal that will close or enable the return gate 225 at step 927 to allow the transmission to pass through the return gate device. A prybar signal from a remote point must be verified by the return gate device before the return gate will be opened. In addition to monitoring the return path 120, the remote point device 140 will monitor the forward path 121 by way of data receiver 220 to determine the return path status, receive commands from headed 102, and execute commands from headed controller 102 at step 930. The above process continues at step 925 until the return gate device is instructed to quit or is no longer operational.

FIG. 10 illustrates the operational flow 1000 of a device that generates return path status for all remote points in bidirectional cable network 100. Any device can be designated at the device that generates return path status for all remote points. In the preferred embodiment the return path status generator 705 in headed 102 generates the return path status for bidirectional cable network 100.

Processing begins at step 1005 and proceeds to continuously monitor return path 120 transmission activity at step 1008. If no remote points are transmitting on the return path 120 at decision step 1015 then a clear status indication is broadcast on the forward path 121 at step 1018 and processing continues at step 1008. If at least one carrier is transmitting on return path 120 at decision step 1015 then processing continues at decision step 1020. If only one carrier is transmitting on return path 120 at decision step 1020 then a busy status indication is broadcast on the forward path 121 at step 1025 and processing continues at step 1008. If more than one carrier is transmitting at decision step 1020 then processing continues at decision step 1028. If more than one carrier is transmitting at decision step 1028 then a jammed status indicator is broadcast on the forward path 121 at step 1030 and processing continues at step 1008. The above process continues until the headed 102 is no longer operational or the network enter a diagnostic or other maintenance or monitoring mode.

Hybrid Contention Based System

An undesirable energy suppression system in a contention based bidirectional cable network can be combined with other contention based protocol and/or a fixed time slot based protocol. The motivation for combining at least one contention based protocol and a fixed time slot protocol in a single network is to provide the best transmission protocol for various types of data and traffic being carried by the network. Telephone conversations, for example, are isochronous, or nearly-synchronous at 64 kb/s and can be most efficiently handled as a continuous stream of time slot data. Alternatively, data traffic such as interactive games and internet browsing can be bursty. Therefore, contention based system characteristics may be best used for bursty traffic in a lightly loaded network with many users rather than a fixed time slot system which may be best used for continuous transmissions in a heavily loaded network. A hybrid contention and fixed time slot based network can be implemented by breaking the return path transmissions into frames that are further divided into contention frames and time division multiplexing frames. Timing information for the network can be delivered in the forward path from the headed to inform all return gate devices and all NIDs in each remote point of the transmission formats. The return gate devices in a hybrid system can be implemented to enable a return gate by either prybar signal activation during a contention time slot or automatic activation during each reoccurring TDMA time slot that is concurrent with a remote point TDMA transmission. This hybrid system would allow both isochronous data and bursty data to be handled efficiently by one network system.

A contention based portion of a hybrid system using a DQRAP or XDQRAP-like protocol can be implemented with the return gate and prybar signal system as follows. A common timing reference marking reoccurring time frames can be established between the remote points and the headed by way of a timing reference signal over the forward path. A frame may be composed of multiple contention based mini-slots and multiple reservation based data slots. Ranging is done so that return path transmissions from the various distances of each remote point will arrive at the start of the pre-assigned time slots. Remote points that wish to transmit data must first contend for a mini-slot by transmitting at a time when a mini-slot should be occurring. The mini-slot carries the remote point's request for data-slots along with the remote point's address and optionally a prybar signal to enable the return gates between the transmitting remote point and the headed. The headed controller 710 assigns one or more data slots to the requesting remote point. The remote point uses the reserved data slots for subsequent data transmissions and/or further communications with the headed controller 710 while always using the gate enabling signal for each subsequent transmission. The return path status indicators of clear, busy, and jammed can be used to arbitrate the contention for mini-slots while the data slots are controlled by a reservation system managed by the headed controller 710.

Alternatively, reserved data slots may be assigned to both the return gate device and the remote point. The return gate device will enable the return gate at the appropriate data slot time without requiring a gate enabling signal from the respective transmitting remote point. If the reserved data slots are cyclically re-occurring, the system becomes very similar to the TDMA implementation with the exception that in the TDMA implementation headend polling is used to enable a return gate for contention type minislots instead of a gate enabling signal from the transmitting remote point.

Summary

This invention relates to a communication network having an undesirable energy suppression system that suppresses undesirable energy in the network's shared communication path from adversely affecting the entire network. The shared communication path has a gate that connects and disconnects the path in response to a gate enabling signal. The network can be a simplex network or a bidirectional network where one direction of the bidirectional network is a shared communication path. Components necessary to implement the communication network disclosed herein are individually known and widely available from manufacturers and/or distributors in the cable industry. Although specific embodiments are disclosed herein, it is expected that persons skilled in the art can and will design alternative systems for suppressing the propagation of undesirable energy in a network that are within the scope of the following claims either literally or under the Doctrine of Equivalents.

What is claimed is:

1. An undesirable energy suppression system in a contention based communication network wherein said contention based communications network includes a communication path between at least one remote point and a headend, said system comprising:

a gate means in said communication path wherein said gate means connects said communication path when said gate means is closed and said gate means disconnects said communication path when said gate means is open;

means for transmitting a signal on said communication path wherein said signal includes a gate enabling signal; and means for closing said gate means only in response to said gate enabling signal.

2. A system according to claim 1 including:

a bidirectional communication path having a first direction for transmitting from said headend toward said at least one remote point and having a second direction for transmitting from said at least one remote point toward said headend;

means for transmitting a first signal in said first direction wherein said first signal includes a timing signal to synchronize said headend and said at least one remote point;

means responsive to said timing signal, for transmitting a second signal in said second direction on a designated time boundary wherein said second signal includes any one of a plurality of coded signals as said gate enabling signal such that only one of said plurality of coded signals uniquely corresponds to an individual one of said at least one remote point; and means for closing said gate means in response to said gate enabling signal and said designated time boundary.

3. A system according to claim 1 including:

a bidirectional communication path having a first direction for transmitting from said headend toward said at least one remote point and having a second direction for transmitting from said at least one remote point toward said headend;

means for transmitting a first signal in said first direction wherein said first signal includes a status signal indicative of transmission activity in said second direction;

means responsive to said status signal, for transmitting a second signal in said second direction wherein said second signal includes said gate enabling signal; and means for closing said gate means in response to said gate enabling signal and said status signal.

4. A system according to claim 3 including:

means for transmitting a first signal in said first direction wherein said first signal includes a timing signal to synchronize said headend and said at least one remote point;

means responsive to said timing signal and said status signal, for transmitting a second signal in said second direction on a designated time boundary when said second direction is clear, wherein said second signal includes said gate enabling signal; and means for closing said gate means in response to said gate enabling signal and said status signal and said designated time boundary.

5. A system to prevent undesirable energy from propagating along a bidirectional communication path of a contention based communication network, wherein said bidirectional communication path includes a forward path from a headend signal source toward a plurality of remote points and a return path from said plurality of remote points toward said headend, and wherein said communication network includes a tree type trunk and distribution branch configuration, said system comprising:

a primary switch means on said return path of said bidirectional communication path;

at least one secondary switch means in said return path between said primary switch means and said headend;

means for assigning a unique coded switch enabling signal to each of said plurality of remote points;

means for validating said unique coded switch enabling signal associated with a transmitting one of said plurality of remote points; and means, in response to validating said unique coded switch enabling signal, for enabling said primary switch means and said at least one secondary switch means to complete said return path and allow a transmission from a transmitting one of said plurality of remote points to pass.

6. A system according to claim 5 including:

means for removing said unique coded switch enabling signal from said transmission in said return path when each of said primary switch means and said at least one secondary switch means are enabled.

7. An undesirable energy suppression system in a contention based communications network wherein said contention based communications network includes a bidirectional communication path between a headend signal source and a plurality of remote points and wherein said bidirectional communication path includes a first direction from said headend toward said plurality of remote points and a second direction from said plurality of remote points toward said headend, said system comprising:

means for transmitting a first signal in said first direction of said bidirectional communication path wherein said first signal includes a status signal indicative of transmission activity in said second direction;

means responsive to said status signal, for transmitting a second signal in said second direction of said bidirectional communication path from any one of said plurality of remote points; and means for controlling a return gate in said second direction of said bidirectional communication path at a time substantially concurrently with said second signal being transmitted in said second direction wherein said controlling means is responsive to said status signal and a gate enabling signal from a transmitting one of said plurality of remote points.

8. A system according to claim 7 wherein said system includes:

means for determining said status signal indicative of transmission activity in said second direction.

9. A system according to claim 7 wherein said means for transmitting said second signal includes:

means for transmitting said second signal in said second direction only when said status signal indicates said second direction is clear; and means for retransmitting said second signal in said second direction after a delay when said status signal indicates said second direction is jammed.

10. A system according to claim 7 wherein said means for controlling includes:

means for assigning a gate enabling signal to each of said plurality of remote points;

means for transmitting said gate enabling signal by said transmitting one of said plurality of remote points substantially concurrently with said second signal transmitted in said second direction;

means for enabling said return gate to complete said second direction of said bidirectional communication path in response to said gate enabling signal from said transmitting one of said plurality of remote points and in response to said status signal indicating said second direction is clear; and means for disabling said return gate to disconnect said second direction of said bidirectional communication path in response to said status signal indicating said second direction is not busy.

11. A system according to claim 10 including:

means for assigning said gate enabling signal wherein said gate enabling signal is shared by at least two of said plurality of remote points.

12. A system according to claim 10 including:

means for assigning said gate enabling signal wherein said gate enabling signal is unique for each of said plurality of remote points.

13. A system according to claim 10 including:

means for removing said gate enabling signal from said second signal after enabling said return gate.

14. A system according to claim 7 including:

means for serving a subset of said plurality of remote points on a distribution branch of said network by way of a single return gate.

15. A system according to claim 7 including:

means for serving said plurality of remote points in said network by way of a plurality of return gates each dedicated to a corresponding one of said plurality of remote points in said network.

16. A system according to claim 15 including:

means for disconnecting an individual one of said plurality of remote points from said first direction of said bidirectional communication path; and means for reconnecting said individual one of said plurality of remote points to said first direction of said bidirectional communication path.

17. A system according to claim 15 including:

means for interdicting said bidirectional communication path at a location proximate to each of said plurality of return gates.

18. A method for suppressing undesirable energy in a contention based communications network wherein said contention based communications network includes a bidirectional communication path between a headend signal source and a plurality of remote points and wherein said bidirectional communication path includes a first direction from said headend toward said plurality of remote points and a second direction from said plurality of remote points toward said headend, said system comprising:

transmitting a first signal in said first direction of said bidirectional communication path wherein said first signal includes a status signal indicative of transmission activity in said second direction;

transmitting a second signal in said second direction of said bidirectional communication path from any one of said plurality of remote points in response to said status signal; and controlling a return gate in said second direction of said bidirectional communication path at a time substantially concurrently with said second signal being transmitted in said second direction wherein said controlling step is responsive to said status signal and a gate enabling signal from a transmitting one of said plurality of remote points.

19. A method according to claim 18 including:

determining said status signal indicative of transmission activity in said second direction.

20. A method according to claim 18 wherein said step of transmitting said second signal includes:

transmitting said second signal in said second direction only when said status signal indicates said second direction is clear; and retransmitting said second signal in said second direction after a delay when said status signal indicates said second direction is jammed.

21. A method according to claim 18 wherein said controlling step includes:

assigning a gate enabling signal to each of said plurality of remote points;

transmitting said gate enabling signal by said transmitting one of said plurality of remote points substantially concurrently with said second signal transmitted in said second direction;

enabling said return gate to complete said second direction of said bidirectional communication path in response to said gate enabling signal from said transmitting one of said plurality of remote points and in response to said status signal indicating said second direction is clear; and disabling said return gate to disconnect said second direction of said bidirectional communication path in response to said status signal indicating said second direction is not busy.

22. A method according to claim 21 including:

assigning said gate enabling signal wherein said gate enabling signal is shared by at least two of said plurality of remote points.

23. A method according to claim 21 including:

assigning said gate enabling signal wherein said gate enabling signal is unique to each of said plurality of remote points.

24. A method according to claim 21 including:

removing said gate enabling signal from said second signal after enabling said return gate.

25. A method according to claim 18 including:

serving a subset of said plurality of remote points on a distribution branch of said network by way of a single return gate.

26. A method according to claim 18 including:

serving said plurality of remote points in said network by way of a plurality of return gates each dedicated to a corresponding one of said plurality of remote points in said network.

27. A method according to claim 26 including:

disconnecting an individual one of said plurality of remote points from said first direction of said bidirectional communication path; and reconnecting said individual one of said plurality of remote points to said first direction of said bidirectional communication path.

28. A method according to claim 26 including:

interdicting said bidirectional communication path at a location proximate to each of said plurality of return gates.

29. A method for suppressing undesirable energy in a contention based communications network having a bidirectional communication path between a headend signal source and a plurality of remote points wherein said bidirectional communication path includes a first direction from said headend toward said plurality of remote points and a second direction from said plurality of remote points toward said headend, said method comprising:

determining transmission activity in said second direction and generating a status signal representing said transmission activity;

transmitting a first signal in said first direction of said bidirectional communication path wherein said first signal includes said status signal;

transmitting a second signal in said second direction of said bidirectional communication path from any one of said plurality of remote points only when said status signal indicates said second direction is clear; and enabling a return gate in said second direction of said bidirectional communication path at a time substantially concurrently with said second signal being transmitted in said second direction wherein said return gate connects said second direction when said status signal indicates that said second direction is clear and in response to said gate enabling signal from a transmitting one of said plurality of remote points.

30. A method according to claim 29 wherein said gate enabling signal is shared among at least one subset of said plurality of remote points.

31. A method according to claim 29 wherein said gate enabling signal is unique to each of said plurality of remote points.

* * * * *

UNITED STATES PATENT AND TRADEMARK OFFICE
CERTIFICATE OF CORRECTION

PATENT NO. : 5,745,836
DATED : April 28, 1998
INVENTOR(S) : Thomas H. Williams

It is certified that error appears in the above-identified patent and that said Letters Patent is hereby corrected as shown below:

Replace all occurrences of "headed" with --headend--

Column 10, Line 43, insert --be-- after "can"

Column 17, Line 37, replace "are" with --as--

Column 18, Line 40, replace "enter" with --enters--

Signed and Sealed this

First Day of September, 1998

BRUCE LEHMAN

Attest:

*Attesting Officer*          *Commissioner of Patents and Trademarks*